May 11, 1954   P. R. RHOADS   2,678,249
MOTOR VEHICLE LUNCH TRAY SUPPORT
Filed Feb. 14, 1952   3 Sheets-Sheet 1
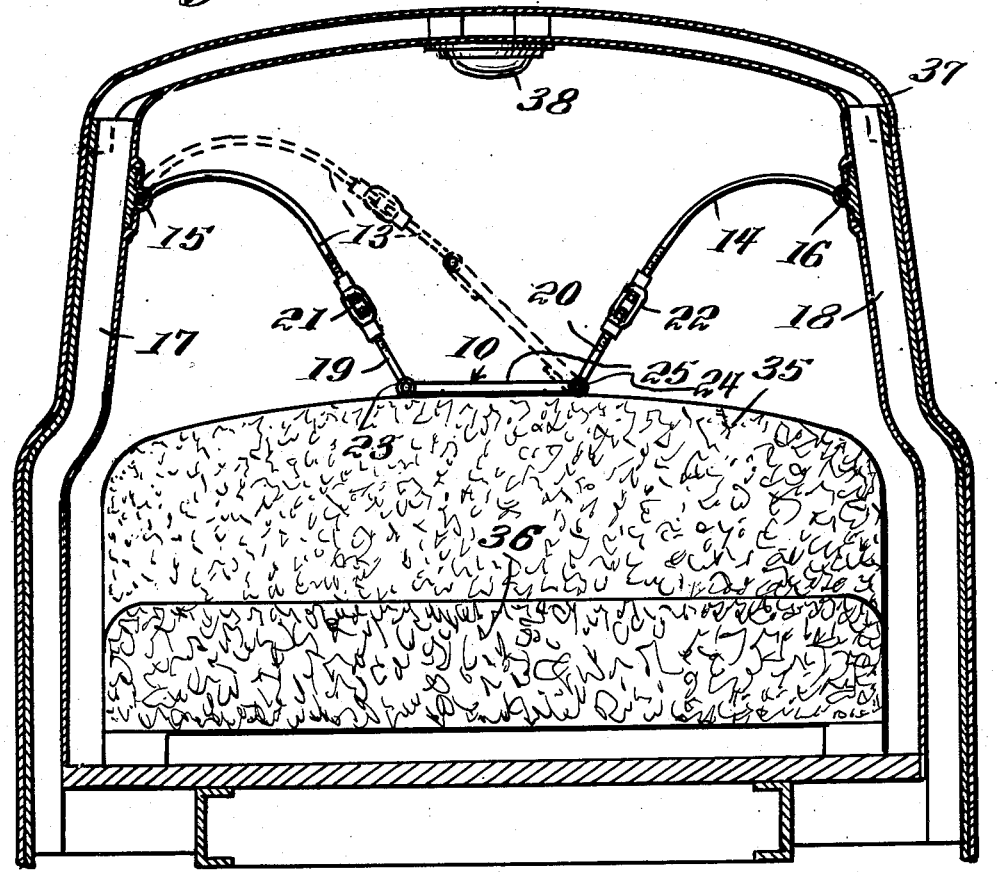
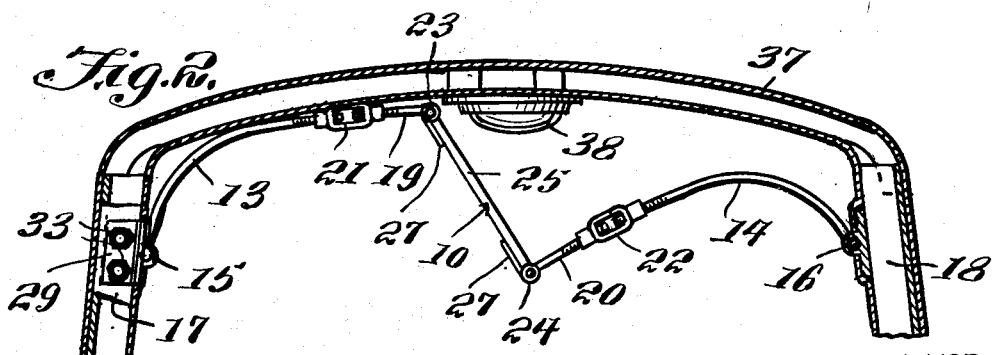
INVENTOR.
Paul R. Rhoads,
BY Victor J. Evans & Co.
ATTORNEYS

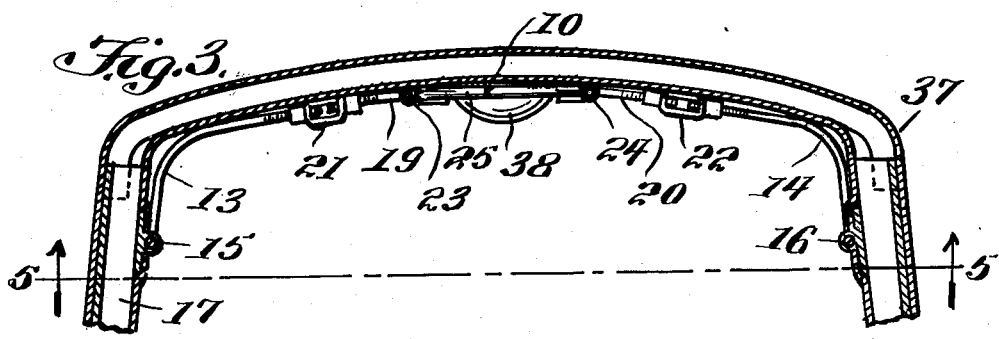
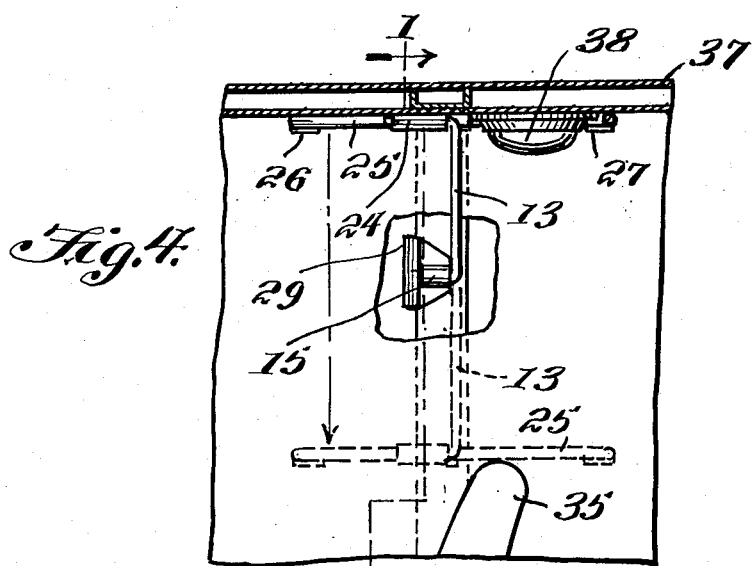
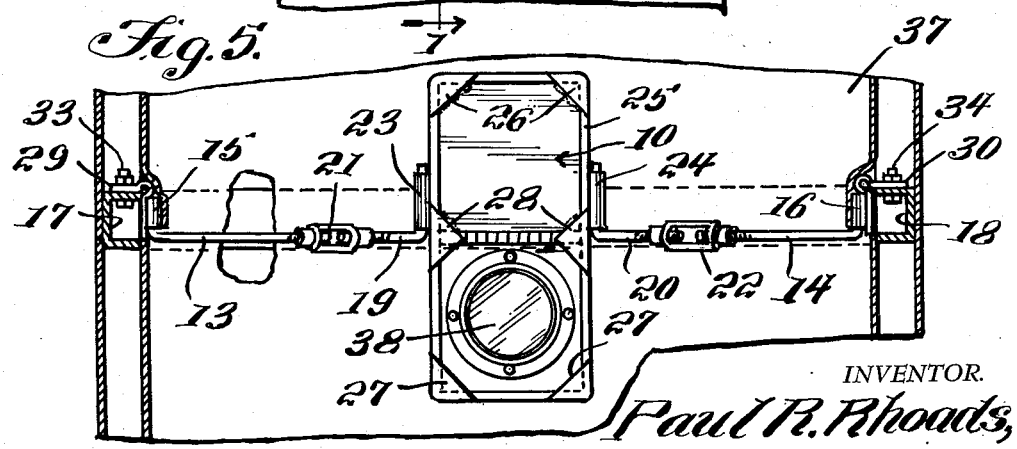

May 11, 1954  P. R. RHOADS  2,678,249
MOTOR VEHICLE LUNCH TRAY SUPPORT
Filed Feb. 14, 1952  3 Sheets-Sheet 3
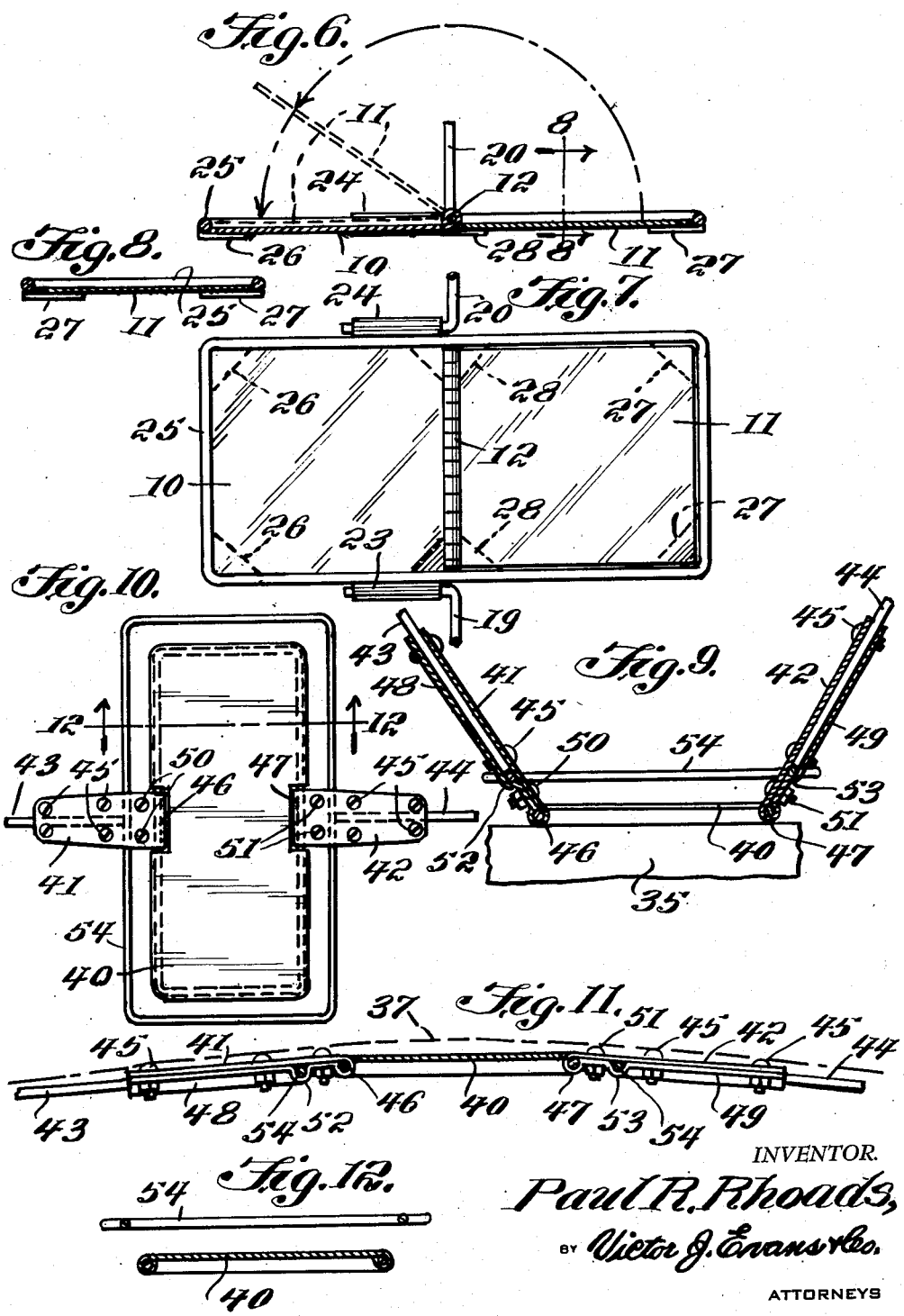
INVENTOR.
Paul R. Rhoads,
BY Victor J. Evans & Co.
ATTORNEYS Patented May 11, 1954

2,678,249

UNITED STATES PATENT OFFICE 2,678,249

MOTOR VEHICLE LUNCH TRAY SUPPORT

Paul R. Rhoads, Crawfordsville, Ind.

Application February 14, 1952, Serial No. 271,576

1 Claim. (Cl. 311—21)

This invention relates to devices for supporting lunch trays and the like in motor vehicles, and in particular a lunch tray carried by spring rods pivotally mounted on the inner surfaces of door posts of a motor vehicle body and positioned whereby a lunch tray is resiliently held against the ceiling of the vehicle and may be drawn downwardly manually to a position upon the back of a seat for use.

The purpose of this invention is to provide means for mounting a lunch tray in a motor vehicle whereby the tray is suspended in an out of the way position when not in use.

Various types of supports have been provided for holding lunch trays in motor vehicles, however, where these are of the portable type they are either stored in the trunk where they are inaccessible when desired or where they are attached to the back of a seat they interfere with use of the vehicle. With this thought in mind this invention contemplates a spring support adapted to resiliently hold a lunch tray against the under surface of a roof of a vehicle body and which is so arranged that a tray supported thereby may be drawn downwardly to a position of rest upon the back of a seat when it is desired to use the tray.

The object of this invention is, therefore, to provide means for forming a support for lunch trays and the like whereby a tray may readily be moved upwardly to a position against the under surface of the roof of a vehicle or may be drawn downwardly to a position upon the back of a seat of the vehicle.

Another object of the invention is to provide a spring actuated lunch tray support for retaining a tray against the under surface of the roof of a vehicle or upon the back of a seat thereof that may be installed in vehicles now in use.

A further object of the invention is to provide a spring actuated support for holding a tray against the under surface of the roof of a vehicle or upon the back of a seat thereof.

With these and other objects and advantages in view the invention embodies a pair of spring arms pivotally mounted with bearing elements upon posts between the doors of a motor vehicle body with extended ends of the arms pivotally attached to a hinged tray and wherein the arms are provided with turnbuckles to provide means for adjusting the length thereof to compensate for vehicles of different sizes.

Other features and advantages of the invention will appear from the following description taken in connection with the drawings, wherein:

Figure 1 is a cross section through a motor vehicle body taken on line 1—1 of Fig. 4 illustrating the lunch tray supporting arms with the tray positioned upon the back of a seat of the vehicle.

Figure 2 is a similar section showing the upper part of the vehicle body and with the lunch tray in the position of being moved upwardly to a position of rest against the under surface of the roof of the vehicle.

Figure 3 is a similar section showing the tray and the spring supporting arms therefor with the parts positioned against the roof of the vehicle.

Figure 4 is a longitudinal section through the vehicle body showing the tray supporting elements on one side of the vehicle body with the tray positioned against the under surface of the roof of the vehicle in full lines and positioned upon the back of a seat of a vehicle in dotted lines.

Figure 5 is a sectional view looking upwardly taken on line 5—5 of Fig. 3 also showing the tray positioned against the under surface of the roof of the vehicle.

Figure 6 is a detail showing the longitudinal section through the tray with the parts shown on an enlarged scale and with the spring arms broken away.

Figure 7 is a plan view of the tray shown in Fig. 6 also showing the spring arms broken away.

Figure 8 is a cross section through the tray taken on line 8—8 of Fig. 6.

Figure 9 is a detail similar to that shown in Fig. 1 illustrating a modification wherein the tray is provided with a guard rail which is spaced above and extended around the outer edge of the tray.

Figure 10 is a plan view of the tray shown in Fig. 9.

Figure 11 is a sectional view, similar to that shown in Fig. 3, showing the position of the tray of the modification shown in Figs. 9 and 10 against the under surface of the roof or car top, the said car top being shown in dash lines.

Figure 12 is a cross section through one side of the tray taken on line 12—12 of Fig. 10 and illustrating the position of the guard rail in relation to the tray.

Referring now to the drawings wherein like reference characters denote corresponding parts the improved lunch tray and spring supports therefor of this invention includes a tray having a base section 10 with a folding section 11 secured to one end thereof with a hinge 12, spring supporting rods or arms formed with sections 13 and 14 which are pivotally mounted in bearings 15 and 16, respectively, on posts 17 and 18, and L-shaped sections 19 and 20 which are connected to the sections 13 and 14 with turnbuckles 21 and 22 and which are pivotally connected to the sides of the base 10 of the tray with bearings 23 and 24.

The base 10 is provided with a U-shaped frame 25 on the sides of which the bearings 23 and 24 are mounted and the folding section of the tray, as indicated by the numeral 11 is movably mounted in the frame 25, the section 11 having end portions which are connected to the portions of the hinge 12. The corners of the frame 25 are provided with gusset plates 26 and 27 and similar gusset plates 28 are provided on the under surface of the frame 26. These plates reinforce the frame and provide retaining means for supporting the tray elements.

The sections 13 and 14 of the spring rods or supports are also provided with L-shaped ends, that are pivotally held in the bearings 15 and 16, and the bearings 15 and 16 are pivotally mounted in brackets 29 and 30. The brackets are secured to the sides of the posts 17 and 18 with bolts 33 and 34.

With the parts assembled in this manner and with the tray and spring actuated supporting arms pivotally mounted in the upper part of a motor vehicle body the tray may be tilted and moved upwardly as illustrated in Fig. 2, and also in the dotted line position shown in Fig. 1 and with the spring rods or arms pressed against the under surface of the car top the tray and the supporting elements therefor are held in nested positions against the top.

When it is desired to use the tray, one end of the tray is drawn downwardly, as illustrated in Fig. 2 and with continued downward movement of the tray it may be positioned on the back 35 of a seat 36 in a motor vehicle car body as indicated by the numeral 37. With the parts of the tray hinged, it may be positioned on one side of the center or so that it will clear the dome-light which is indicated by the numeral 38.

In the modification illustrated in Figs. 9, 10, 11 and 12 a continuous tray 40 is secured in the ends of brackets 41 and 42 and the brackets are clamped over the ends of sections 43 and 44, similar to the sections 19 and 20 with screws, as indicated by the numeral 45 or other means.

As illustrated in Fig. 9 the brackets 41 and 42 are provided with eyes 46 and 47, respectively, in which the frame members of the tray 40 are held. From the eyes 46 and 47 the ends 48 and 49 of the brackets 41 and 42 extend substantially parallel to the parts 41 and 42 with sections thereof adjacent the eyes extended inwardly and secured to the brackets with bolts 50 and 51 thereby providing sockets 52 and 53 in which the sides of a guard rail 54 are held, as shown in Fig. 9. From the sockets 52 and 53 the sections 48 and 49 of the brackets extend parallel to the brackets and are clamped over the sections 43 and 44 of the spring arms with the screws 45.

The tray of this design is particularly adapted for motor vehicles without dome lights or where the dome lights are offset in relation to the posts at the sides of the doors of the vehicle.

The sections 43 and 44 replace the sections 19 and 20 and form extensions of the sections 13 and 14, which are pivotally mounted on the posts of the vehicle body, or on the inner surface of said body.

The spring arms are, therefore, adapted to support trays of different designs and it will be appreciated that the trays may be located in different positions and attached to the spring arms by other suitable means.

Being resiliently held against the under surface of the car top when not in use, the tray may remain in position continuously and being in this position, it does not interfere with general use of the vehicle.

When it is desired to use the tray it is only necessary to draw the tray downwardly whereby it may be positioned on the back of a seat, as illustrated in Fig. 1, and the tray is ready for use.

The tray is illustrated as being rectangular shaped in plan and it may be made of any other suitable shape.

What is claimed is:

In combination, in a vehicle including a front seat, a pair of spaced apart posts mounted on the sides of the vehicle within the vehicle, a tray mounted for movement into and out of engagement with the top of the front seat, a pair of spring supporting arms pivotally connected to said tray and to said posts, and means embodying turnbuckles for adjusting the length of said arms, the longitudinal axis of the arms being arranged at right angles with respect to the longitudinal axis of the vehicle.

References Cited in the file of this patent

UNITED STATES PATENTS

| Number | Name | Date |
|---|---|---|
| 6,390 | Jacques | Aug. 24, 1849 |
| 1,524,897 | Weil | Feb. 3, 1925 |
| 1,701,696 | Parsons | Feb. 12, 1929 |
| 1,752,818 | Taylor | Apr. 1, 1930 |
| 1,819,516 | Kelly | Aug. 18, 1931 |
| 2,468,412 | Schaefer | Apr. 26, 1949 |
| 2,474,943 | Hedger | July 5, 1949 |

FOREIGN PATENTS

| Number | Country | Date |
|---|---|---|
| 381,625 | Great Britain | Oct. 13, 1932 |
| 392,789 | France | Dec. 4, 1908 |
| 439,898 | Great Britain | Dec. 17, 1935 |